(No Model)
F. K. HESSE.
LANTERN OR OTHER CARRIER FOR BICYCLES, &c.
No. 585,269. Patented June 29, 1897.
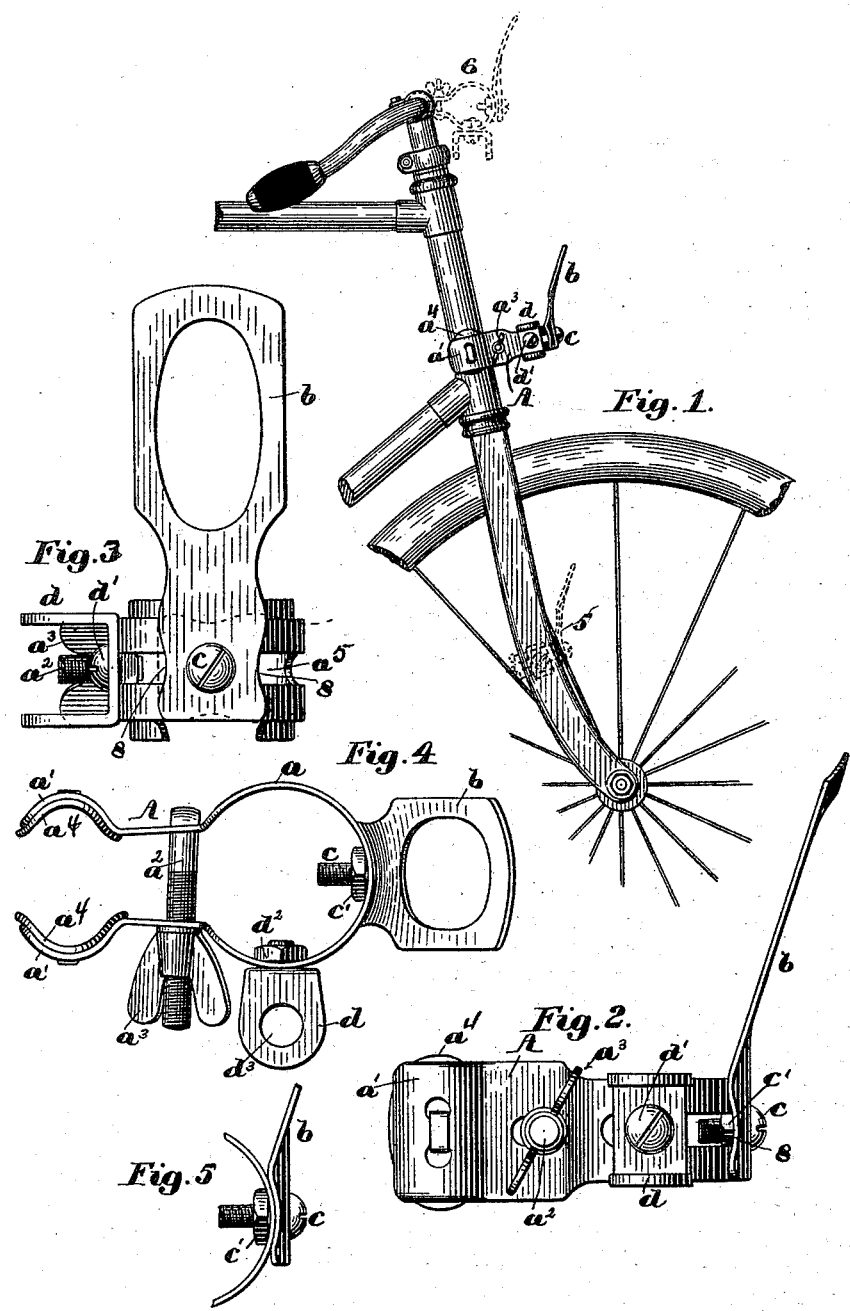
Witnesses:
Walter E. Lombard.
Thomas J. Drummond.
Inventor:
Frank K. Hesse,
by Crosby & Gregory,
Att'ys.

UNITED STATES PATENT OFFICE.

FRANK K. HESSE, OF BOSTON, MASSACHUSETTS, ASSIGNOR, BY MESNE ASSIGNMENTS, TO HOWARD L. SHURTLEFF, OF SAME PLACE.

LANTERN OR OTHER CARRIER FOR BICYCLES, &c.

SPECIFICATION forming part of Letters Patent No. 585,269, dated June 29, 1897.

Application filed January 10, 1896. Serial No. 574,961. (No model.)

*To all whom it may concern:*

Be it known that I, FRANK K. HESSE, of Boston, county of Suffolk, State of Massachusetts, have invented an Improvement in Lanterns or other Carriers for Bicycles and the Like, of which the following description, in connection with the accompanying drawings, is a specification, like letters on the drawings representing like parts.

This invention relates to carriers employed with bicycles and the like for supporting or carrying a lantern or article of luggage.

The prime object of my invention is to provide an improved construction which shall enable the carrying member to be turned to face in any direction—for instance, for the purpose of directing the rays of light from the lantern in any desired path—and a device also which may be secured horizontally to the side bar of a fork or vertically to the horizontal handle-bar, either of these positions capable of adjustment so that the carrying member shall stand in either a vertical or a horizontal position, as desired, and turned to vary its angular position at will.

My invention comprehends further improvements, as hereinafter described and claimed.

The carrier is of course provided with suitable means for clamping or otherwise securing it to any desired part of the bicycle or vehicle.

In the drawings, Figure 1, in side elevation, shows a sufficient portion of a bicycle provided with a carrier sufficient to enable my invention to be understood, the figure showing said carrier in one position in full lines and in another position in dotted lines; Fig. 2, a full-sized side elevation of the carrier shown in Fig. 1; Fig. 3, a full-sized front elevation of the carrier, Figs. 1 and 2; Fig. 4, a top or plan view of the same, and Fig. 5 a detail showing the carrier member in a different position on and with relation to its suporting member.

In the drawings illustrating one embodiment of my invention, referring particularly to Figs. 1 to 4, inclusive, my invention comprises a suitable supporting member, as A, provided with an arc-shaped portion, as $a$, to which a carrying member, as $b$, is attached, and about which, in the arc of a circle, the said carrying member is also adjustable for purposes to be more fully hereinafter set forth.

In the embodiment of my invention the supporting member A, as herein shown, is U-shaped, the arc-shaped portion $a$ constituting the bend or crown of the U, the legs of the U at their ends being in the present instance and preferably formed at $a'$ to constitute clamping-surfaces adapted to embrace between them a fork, handle-bar, or other member of the bicycle or machine to which it is desired the carrier shall be attached.

A suitable clamping-screw $a^2$, provided with a clamping-nut $a^3$, is herein provided for drawing the two clamping ends $a'$ together, the latter being shown as provided with soft faces $a^4$, as leather.

The carrying member $b$, which may be of suitable or desired shape and construction, is adapted, as described, for adjustment in the arc of a circle above the arc-shaped portion $a$ of the support, and in order that said carrying member in any of its adjusted positions may be rigidly held upon the arc-shaped support I have concaved or rounded the said member $b$ at its lower end adjacent to and to conform approximately at least, but preferably accurately, to the curvature $a$ of the support. This is best shown by reference to Figs. 2 and 4, wherein it will be seen that in the direction of its length the member $b$ is curved to conform to the curvature of the portion $a$, as viewed in Fig. 4, so that in any of its adjusted positions about the portion $a$ it fits accurately thereupon.

To clamp the member $b$ upon its support $a$, I have herein provided a clamping-screw $c$, passed through a hole in the member $b$ and at its inner end passing through a circular slot $a^4$ in the arc-shaped portion $a$ of the support, a nut $c'$, threaded upon its inner end, serving with the screw to clamp the member $b$ firmly in desired adjusted position.

Referring now to Fig. 1, when the carrier is clamped upon the steering-head of the machine, as shown in full lines, the member $b$, if to carry a lantern, should be directed forward in the line of travel of the machine; but if clamped lower down upon one of the arms of the fork, as in the dotted position 5, Fig. 1, it would be desirable, if a lantern was carried, to adjust the member $b$ to the left or toward the wheel to cause the rays of light from the lantern to be directed somewhat at an angle in order to lie in the path of the bicycle in advance of the same.

If luggage was carried, it might be desirable to turn the member $b$ farther away from the wheel, but with the carrier on either side of the machine the member $b$ may be adjusted into any desired position for most conveniently and properly carrying the article supported thereupon. It is frequently desirable, however, to mount such a carrier upon the horizontal handle-bar of the machine, and this I have provided for in my novel device, as best illustrated in Figs. 1 and 5.

Referring to Fig. 1, the carrier is shown in dotted position 6 upon the handle-bar; but it will be evident that when clamped upon the handle-bar, as shown, the member $b$, if permitted to remain in the position Figs. 2 and 4, would lie in a horizontal position instead of standing in a vertical position. To provide for this, the nut $c'$ is slackened and the member $b$ turned into a vertical position, as indicated in the dotted position Fig. 1, said member then standing in a plane substantially coincident with the plane of the slot $a^5$ of the arc-shaped portion of the supporting member, where it is clamped by tightening the nut referred to. When in the position 6 the member $b$ may be adjusted in a vertical plane about the arc-shaped portion $a$ to cause the light from a lantern carried thereby to strike the roadway a few feet in front of the wheel or at a considerable distance therefrom, as described.

Since the lower or clamping end of the member $b$ is curved to conform to the arc $a$ when in the position Figs. 2 to 4, it would not of course naturally conform to the same arc when turned in a position at right angles to the position Figs. 2 to 4. In other words, it would not naturally conform when in the position Figs. 5 and 6. To correct this, (see Figs. 2 and 3,) I have concaved the edges of the member $b$ at 8, as shown, so that viewing the member edgewise the line of the edge 8 as it works toward the middle line of the member $b$ also presents a curve at right angles to the curvature of the end of the member, this curved line 8 (see Fig. 5) conforming to the curvature of the arc portion $a$. Thus the member $b$ in either of its positions fits perfectly the curvature of the arc portion $a$, thereby holding the member $b$ rigidly in position.

My invention further comprehends the use of an auxiliary carrying member, as $d$, (shown as a U-shaped sheet-metal member clamped to the arc portion $a$ by a screw $d'$ and nut $d^2$, arranged as with the screw and nut $c$ and $c'$.) This auxiliary member $d$ may be perforated, as at $d$, top and bottom to receive the staff of a flag or other article. When not needed, this auxiliary carrier may be removed, and it, too, when in position may be adjusted to any desired angle.

My invention is not limited to the particular embodiment herein shown, for it is evident that the same may be varied without departing from the spirit and scope of the invention.

Having described one embodiment of my invention and without limiting myself as to details, what I claim, and desire to secure by Letters Patent, is—

1. In a carrying device of the class described, a support provided with an arc-shaped portion, and means to secure the same in position, combined with a carrier mounted upon and movable bodily about and in an arc concentric with said arc-shaped portion, for varying the angular position of said carrier relatively to its support, substantially as described.

2. In a carrying device of the class described, a support having a slotted arc-shaped portion, combined with a carrier mounted upon and movable bodily about, and in an arc concentric with, said arc-shaped portion, and a clamping device coöperating with said slotted arc-shaped portion to retain said carrier in adjusted angular position, substantially as described.

3. In a carrying device of the class described, the combination with a support having an arc-shaped portion, of a carrier mounted upon and adjustable in an arc about said arc-shaped portion, and provided with curved bearings to fit said arc-shaped portion, and means to clamp said carrier in desired angular position, substantially as described.

4. In a carrying device of the class described, the combination with a support having an arc-shaped portion, of the carrier curved to present arc-shaped bearings standing at an angle to each other, whereby said carrier can be turned into substantially vertical or substantially horizontal position relatively to said arc-shaped portion, and means to clamp the said member in adjusted position, substantially as described.

5. In a carrying device of the class described, a support in the form of a band bent around in the form of an arc, and means additional thereto for securing the same in position, said arc-shaped portion being transversely slotted to receive a carrying member for adjustment therein, and being provided with a further slot adapted to receive an auxiliary carrier, substantially as described.

6. In a carrying device of the class described, the combination with a U-shaped support, having an arc-shaped crown portion slotted in the plane of said U-support, the ends of the members of the U constituting clamping ends, and means to draw the same one toward the other, of a carrying member adjustable upon said arc-shaped portion, being bodily movable along said slot and means coöperating with said slot to secure said carrying member in adjusted position, substantially as described.

7. In a carrying device of the class described, a support having a curved surface, and means to secure the said support in position, combined with a carrier mounted upon and bodily adjustable about the said curved surface, and means to clamp the carrier against the said curved surface, substantially as described.

In testimony whereof I have signed my name to this specification in the presence of two subscribing witnesses.

FRANK K. HESSE.

Witnesses:
  JOHN C. EDWARDS,
  AUGUSTA E. DEAN.